US011106551B1

(12) United States Patent
Featonby et al.

(10) Patent No.: US 11,106,551 B1
(45) Date of Patent: Aug. 31, 2021

(54) COMPUTE CAPACITY RESERVATIONS FOR DISASTER RECOVERY SCENARIOS

(71) Applicant: Amazon Technologies, Inc., Seattle, WA (US)

(72) Inventors: Malcolm Featonby, Sammamish, WA (US); Jacob Adam Gabrielson, Seattle, WA (US); Manish Singh Rathaur, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 15/967,337

(22) Filed: Apr. 30, 2018

(51) Int. Cl.
*G06F 11/20* (2006.01)
*G06F 9/455* (2018.01)
*G06F 9/50* (2006.01)

(52) U.S. Cl.
CPC ...... *G06F 11/2023* (2013.01); *G06F 9/45558* (2013.01); *G06F 9/50* (2013.01); *G06F 9/5027* (2013.01); *G06F 2009/45595* (2013.01); *G06F 2201/815* (2013.01)

(58) Field of Classification Search
CPC ........ G06F 15/173; G06F 9/50; G06F 9/5027; G06F 11/2023; G06F 9/45558; G06F 2009/45595; G06F 2201/815; H04L 47/76; H04L 41/085; H04L 41/0856; H04L 41/08; H04L 47/72; H04L 47/70; G05F 11/2023
See application file for complete search history.

(56) References Cited

U.S. PATENT DOCUMENTS

| 7,870,044 | B2* | 1/2011 | Robertson | G06Q 20/102 |
| | | | | 705/1.1 |
| 8,775,282 | B1* | 7/2014 | Ward, Jr. | H04L 41/0896 |
| | | | | 705/34 |
| 8,850,434 | B1* | 9/2014 | Butikofer | G06F 9/45558 |
| | | | | 718/1 |
| 9,306,814 | B1* | 4/2016 | Roth | H04L 41/085 |
| 9,451,013 | B1* | 9/2016 | Roth | H04L 67/1097 |
| 10,069,680 | B1* | 9/2018 | Wylie | G06F 9/45558 |

(Continued)

OTHER PUBLICATIONS

Agarwal, "Volley: Automated Data Placement for Geo-Distributed Cloud Services" Mar. 2010, Microsoft, pp. 1-16 (Year: 2010).*

*Primary Examiner* — Yolanda L Wilson
(74) *Attorney, Agent, or Firm* — Nicholson De Vos Webster & Elliott LLP

(57) ABSTRACT

Techniques are described for enabling users to create reservations for compute capacity at a service provider network intended for use in disaster recovery scenarios. A service provider can use separate geographic areas (sometimes referred to as "regions" or "availability zones") defined by the service provider network to enable users to share reservations of compute capacity intended for use in disaster recovery scenarios. A disaster recovery launch reservation (DRLR) is a reservation of a given unit of compute capacity that is unique to a source geographic area (that is, a defined area of the service provider network containing computing resource(s) for which a user desires to obtain backup compute capacity) and a destination area (that is, a defined area of the service provider network at which the reserved compute capacity is located), where other users can reserve the compute capacity relative to other source geographic area-to-destination geographic area mappings.

20 Claims, 7 Drawing Sheets

(56) References Cited

U.S. PATENT DOCUMENTS

| | | | |
|---|---|---|---|
| 10,152,449 B1* | 12/2018 | Ward, Jr. | G06F 15/173 |
| 2003/0028642 A1* | 2/2003 | Agarwal | G06F 9/505 |
| | | | 709/226 |
| 2003/0191841 A1* | 10/2003 | DeFerranti | H04L 12/14 |
| | | | 709/226 |
| 2005/0038968 A1* | 2/2005 | Iwamura | G06F 11/2058 |
| | | | 711/162 |
| 2006/0179143 A1* | 8/2006 | Walker | G06F 15/173 |
| | | | 709/226 |
| 2009/0063892 A1* | 3/2009 | Abdulvahid | H04L 67/1095 |
| | | | 714/4.4 |
| 2011/0185064 A1* | 7/2011 | Head | G06F 9/5077 |
| | | | 709/226 |
| 2011/0264530 A1* | 10/2011 | Santangelo | G06Q 30/0251 |
| | | | 705/14.64 |
| 2014/0297866 A1* | 10/2014 | Ennaji | G06F 9/45533 |
| | | | 709/226 |
| 2016/0072661 A1* | 3/2016 | Arwe | H04L 41/5051 |
| | | | 709/223 |
| 2016/0080282 A1* | 3/2016 | Meijer | H04L 29/08072 |
| | | | 709/226 |
| 2016/0085643 A1* | 3/2016 | McAlister et al. | G06Q 40/04 |
| | | | 714/4.12 |
| 2016/0285798 A1* | 9/2016 | Smullen | H04L 51/046 |
| 2019/0146850 A1* | 5/2019 | Quinn | H04L 41/082 |
| | | | 709/226 |
| 2020/0007457 A1* | 1/2020 | Greenstein | H04L 47/125 |

\* cited by examiner

COMPUTE CAPACITY RESERVATIONS FOR DISASTER RECOVERY SCENARIOS

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
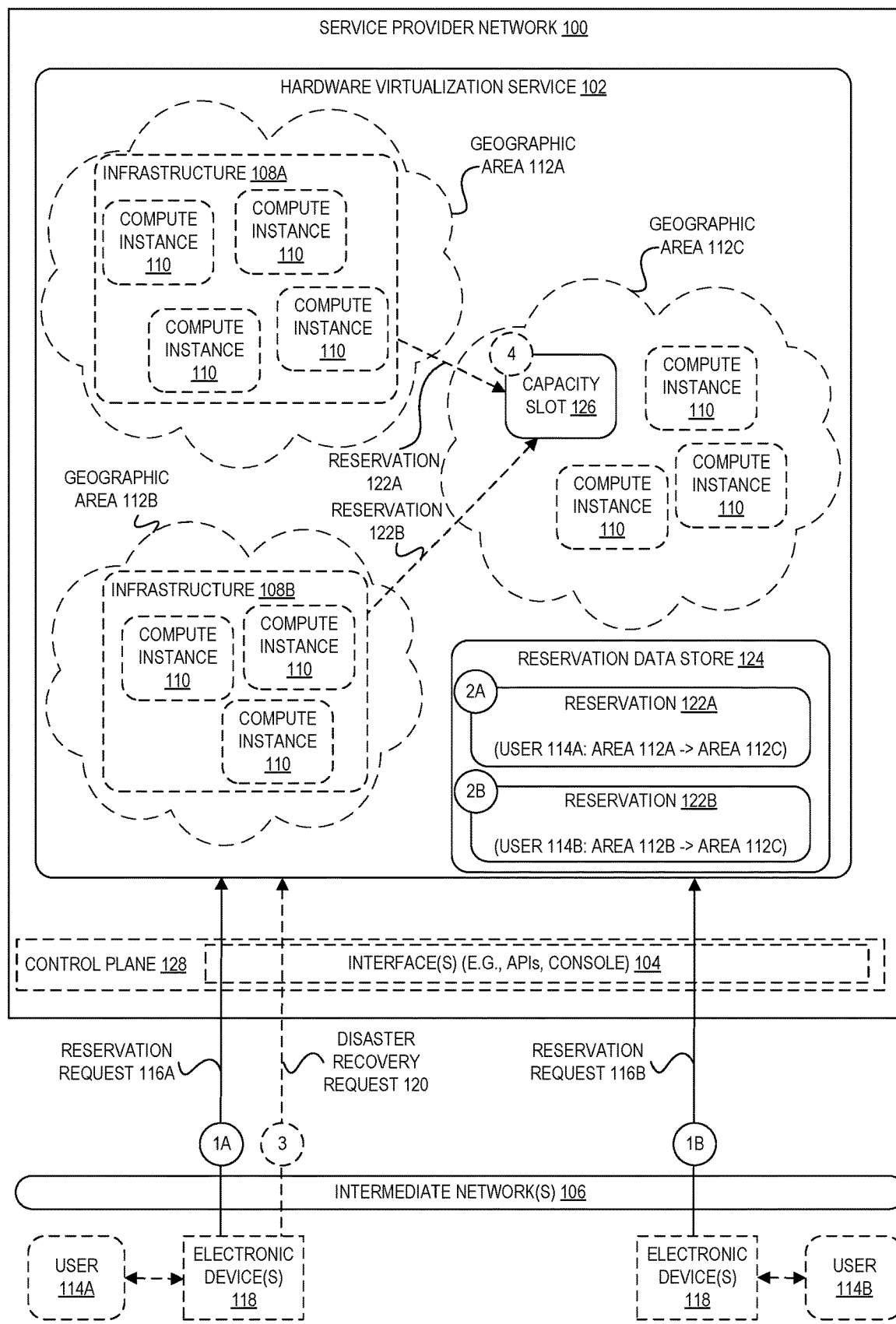
FIG. 1 is a diagram illustrating a computing environment for creating and using compute capacity reservations for disaster recovery scenarios according to some embodiments.

Various embodiments of methods, apparatus, systems, and non-transitory computer-readable storage media are described for enabling users to create reservations for compute capacity at a service provider network intended for use in disaster recovery scenarios. According to embodiments herein, a service provider network supports various types of computing resources (for example, virtual machine (VM) instances, physical servers, database instances, and so forth) created and managed by users of the service provider network. For example, the computing resources may be part of users' information technology (IT) infrastructures supporting various types of user technology systems and applications. In some cases, users of a service provider network may desire to plan for disaster recovery scenarios involving the IT infrastructures managed by the users at the service provider network (or, in some examples, involving infrastructures managed at on-premises environments).

In an embodiment, disaster recovery refers generally to various types of policies, tools, and procedures used to plan for and to recover from natural or human-induced disasters. In this context, a "disaster" can refer broadly to any event that negatively impacts some or all of the computing resources of an IT infrastructure managed by a business or other entity. Examples of disasters can include, but are not limited to, hardware and software failures, network outages, power outages, damage caused by fires, floods, or earthquakes, human error, or any other type of significant event. As indicated above, the computing resources affected by a disaster may be implemented by hardware and software managed by an entity at on-premises computing environments or implemented by hardware and software managed by a service provider network.

In many cases, businesses and other entities attempt to plan and prepare for recovery from disasters in part to minimize the impact of such disasters on IT and technology systems supporting the entities' business functions. For example, an entity that manages an IT infrastructure comprising some number of computing resources might in some cases duplicate their infrastructure to ensure the availability of replacement computing resources in the event of a disaster. The infrastructure supporting this backup capacity needs to be procured, configured, and maintained so that it is ready to support anticipated capacity requirements in the event of a disaster. During normal operations, however, this infrastructure set aside for disaster recovery typically is vastly under-utilized.

Service provider networks have provided such entities with simpler and more cost-effective disaster recovery solutions. For example, the ability to provision resources at a service provider network "on-demand" means that entities can duplicate their infrastructure on an as-needed, "pay-as-you-go" basis. This allows entities to create backup capacity for their IT infrastructures without incurring the expense of a maintaining a duplicate infrastructure. In the event of a disaster, an entity can quickly launch computing resources at the service provider network to sustain operation of their IT infrastructures, assuming such resources at the service provider network are available.

However, many entities that create a disaster recovery plan for their IT infrastructure may desire some level of assurance that a service provider network has sufficient compute capacity immediately available to support their infrastructure in the event of a disaster. To address these concerns and others, some service provider networks allow customers to reserve compute capacity for possible future use by purchasing so-called "launch reservations." In general, a launch reservation enables customers to pre-purchase one or more units of reserved compute capacity (also sometimes referred to herein as compute capacity "slots") on specified types of computing devices. To reserve these compute capacity slots, some service provider networks may charge users the same price or nearly the same price for the slot as if it was a standard compute instance, even if the users rarely or never actually make use of the reserved capacity. Some users may view this as a suboptimal arrangement for disaster recovery solutions because of the relatively high likelihood that the reserved capacity is never used to recover from a disaster. This presents challenges for service providers at least because when a service provider reserves compute capacity for a user, the service provider has to purchase and maintain the compute capacity to be ready for use at all times and thus typically is not able to use that capacity in other meaningful ways even if the capacity is never used.

According to embodiments described herein, certain properties of service provider network infrastructures can be used to enable service providers to provide reservations of compute capacity that can be shared concurrently by multiple different users of the service provider network. For example, computing resources offered by a service provider network are generally supported by servers and other infrastructure located in data centers around the world. These data centers and the infrastructure generally is often geographically and logically grouped by service providers into defined sets of geographically separate areas (for example, one or more of a service provider's data centers may be grouped into a U.S. East area, another one or more data centers grouped into a U.S. West area, yet other data centers grouped into an Asia Northeast area, and so forth). In other examples, a service provider may separate computing resources into other types of areas that may overlap geographically to some degree, but that are separated in other ways (for example, isolated areas of a same data center, groups of computing resources having separate power sources, and so forth). Service providers may design each defined area to have some amount of isolation from other areas to achieve a level of fault tolerance and stability in the case of disasters or other significant events affecting one or more particular defined areas at any given time.

Each service offered by a service provider network (for example, a hardware virtualization service providing compute instances, a database virtualization service providing database instances, and so forth) may be supported by computing devices located in some or all of the areas defined by the service provider network. When a user uses a hardware virtualization service to launch a new compute instance, for example, the user may select one of a plurality of defined geographic areas in which to launch the compute instance from a list of available areas that are supported by the service. A customer might select one area over another for any number of reasons, including to reduce latency (for example, because other system components with which the compute instance is to interact are in or near the same area), to minimize costs, or to address regulatory requirements. Furthermore, a customer might create computing resources in multiple different areas to add redundancy to the customer's IT infrastructure.

In some embodiments, a service provider uses these defined areas of the service provider network to enable users to share reservations of compute capacity intended for use in disaster recovery scenarios. In one embodiment, a service provider enables users to obtain disaster recovery launch reservations (DRLRs) which represent a compute capacity reservation at a destination area (that is, a defined area of the service provider network at which the reserved compute capacity is located) that is unique relative to a source area (that is, a defined area of the service provider network containing the computing resource(s) for which a user desires to obtain backup compute capacity), but which may be reserved by other users for different source area-to-destination area mappings. For example, if a service provider network has defined geographic areas A, B, and C, a first user can obtain a reservation of a unit of compute capacity located in the area C intended to be used for compute instance failures occurring in area A, while a second user can obtain a concurrent reservation for the same unit of compute capacity located in area C intended to be used for compute instance failures occurring in area B.

At a high level, the ability for multiple users of a service provider network to reserve the same compute capacity as described above is enabled in part by the fact that separate areas defined by a service provider network generally fail independently of one another. For example, based on a level of confidence that any two distinct areas of a service provider network experience disasters independently of one another, a service provider network can provide disaster recovery reservations to multiple different users for the same underlying compute capacity if the reservation is provided only once per source area-to-destination area mapping. Among other benefits, the ability to offer concurrent reservations of the same compute capacity to multiple users of a service provider network enables the service provider network to reduce an amount of hardware needed to support such disaster recovery reservations, thereby saving energy and infrastructure costs and making more efficient use of the service provider's available computing resources. Furthermore, the ability to effectively "oversubscribe" reservations of compute capacity may enable service providers to offer the reservations at a lower cost to users, thereby allowing those users to more efficiently and cost-effectively plan for disaster recovery scenarios.

FIG. 1 is a block diagram illustrating an environment for creating compute capacity reservations at a service provider network for disaster recovery scenarios according to some embodiments. In an embodiment, a hardware virtualization service 102 operates as part of a service provider network 100 and comprises one or more software modules executed by one or more electronic devices at one or more data centers and geographic locations. The service provider network 100 in FIG. 1 shows only a hardware virtualization service 102 for illustrative purposes; in general, a service provider network may provide many different types of services as part of the provider network 100.

A provider network 100 provides users with the ability to use a variety of types of computing-related resources such as compute resources (for example, executing VM instances or containers, executing batch jobs, executing code without provisioning servers), data and storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service 102 that can execute compute instances 110 (for example, physical servers, VMs, containers, and so forth), a storage virtualization service that can store data objects, and so forth. The users (or "customers") of provider networks 100 may use one or more user accounts that are associated with a customer account, though these terms may be used somewhat interchangeably depend ending upon the context of use. Users may interact with a provider network 100 across one or more intermediate networks 106 (for example, the internet) via one or more interface(s) 104, such as through use of application programming interface (API) calls, via a console implemented as a website or application, and so forth. The interface(s) 104 may be part of, or serve as a front-end to, a control plane 128 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to manage and use compute instances 110 (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly use compute instances 110 hosted by the provider network to perform a variety of computing tasks, or may indirectly use compute instances by submitting code to be executed by the provider network, which in turn uses a compute instance to execute the code (typically without the user having any control of or knowledge of the underlying compute instance(s) involved).

In FIG. 1, several compute instances 110 have been created at the service provider network 100, each located in one of a plurality of geographically separate areas 112A-112C defined by the service provider network 100. For example, some of the compute instances 110 may be part of various IT infrastructures (for example, infrastructures 108A and 108B) created by users of the service provider network for any of number of different purposes. Although a relatively small number of compute instances 110 and areas 112A-112C are shown in FIG. 1, in practical implementations, a service provider network 100 may host many thousands of compute instances at any given time across any number of separately defined geographic areas. As indicated above, it has become desirable at times for users of a service provider network 100 to reserve compute capacity at the service provider network for disaster recovery scenarios and other reasons. For example, a user may desire to reserve capacity at a service provider network 100 as backup for compute instances 110 managed by the user at the service provider network (or, in some examples, for compute instances managed by the user at a separate on-premises computing environment).

In FIG. 1, for example, the computing resources provided by the hardware virtualization service 102 (for example, compute instances 110) are provided at a number of separate areas defined by the service provider (for example, geographic areas 112A-112C). In some examples, the defined areas may be referred to as "regions," "availability zones," or simply "zones." In other examples, areas defined by a service provider may be grouped hierarchically into regions, each of which contains some number of separate availability zones. In general, a service provider network may define any number of separate areas, each corresponding to a location at which the service provider network has hardware resources supporting one or more computing resource services provided by the service provider network (for example, one or more service provider managed data centers in a particular geographic area). A user of the service provider network can create, or "place," computing resources (for example, compute instances 110) in one or more of the defined geographic areas, as desired. As indicated above, some service providers may create and define the areas such that they have some degree of fault isolation from one another based on geographic separation or other types of group independence. A customer may then place resources in multiple availability zones to provide redundancy for their IT infrastructures, to reduce latency in their infrastructures, to address security or regulatory compliance regulations, among any number of other reasons.

In one embodiment, a console 104 is configured with user interface elements that allow users (for example, users 114A and 114B) to create compute capacity reservations, including disaster recovery reservations or DRLRs, and to use compute capacity reservations as backup capacity in the event of compute instance failures, also sometimes referred to herein as "primary" compute instance failures to indicate that the resources may typically be the user's primary or production resources supporting the user's infrastructure. For example, a user 114A may use a console 104 to request a compute capacity reservation by sending a reservation request 116A to the hardware virtualization service 102 (as shown at the circle labeled "1A" in FIG. 1). In an embodiment, a reservation request 116A may include one or more of: an identifier of a user account associated with the user 114A generating the reservation request, an identifier of a source geographic area where the user currently has or intends to have one or more compute instances for which the user desires backup capacity (for example, a geographic area 112A where a user has an infrastructure 108A comprising some number of compute instances 110), an identifier of a destination geographic area where the user desires have reserve compute capacity (for example, a geographic area 112C), a type of compute instance that the user desires to reserve (for example, a user may desire to reserve a same type of compute instance in the destination area or, in some cases, may desire a different type of compute instance), a time duration or term for which the user desires to reserve the backup capacity (for example, six months, one year, three years, and so forth), and an indication that the reservation request is a disaster recovery reservation request. For example, the user 114A may use an interface 104 (for example, a console) to request the reservation and the input may cause an electronic device 118 to issue a reservation request 116A (for example, an API call, a HyperText Markup Language (HTML) form submission, and so forth) sent to the service provider network 100.

In some embodiments, a user 114A may generate a reservation request 116A by explicitly providing some or all of the parameters mentioned above, for example, by providing input to a console 104 or other interface identifying a source geographic area, a destination geographic area, type of reserved computing instance, and so forth. In other embodiments, some or all of the parameters of a reservation request 116A may be generated automatically for a user as part of the request generation process. As one example, a user may generate a reservation request 116A in part by selecting a compute instance 110 for which the user desires to obtain backup compute capacity from a list of compute instances associated with user's account. Based on the selection of the compute instance, the hardware virtualization service 102 may automatically determine a source geographic area for the reservation request (for example, based on the location of the selected compute instance) and may display to the user destination areas at which compute capacity is available is for reservation for the selected instance. As described in more detail below, the destination areas at which a user can obtain a disaster recovery reservation of compute capacity may be based in part on the identified source area, a number of available capacity slots in each of the available destination areas, existing reservations for available capacity slots in each of the areas, and so forth. A list of possible destination areas presented to the user may be sorted based on various criteria including a distance from the selected source area, areas where the user has existing compute instances, or based on any other properties. In general, a set of possible compute capacity slots available for reservation for a particular source destination area may include those compute capacity slots that are not reserved as a backup for any other computing resource in the same source geographic area, but may include compute capacity slots that are reserved as a backup for other computing resources in different source geographic areas and associated with different users.

In an embodiment, a unit of compute capacity or compute capacity "slot" generally represents a portion of computing resources available on a computing device managed by the service provider network 100. For example, depending on a type of the device (and associated compute, memory, and network resources), each computing device managed by the service provider network 100 is able to support some number of compute instances in its available slots. A particular compute capacity slot at a computing device can either be occupied by an existing compute instance or possibly available for use by a compute instance. In some embodiments, a compute capacity slot may be specific to a particular computing device (for example, a compute capacity slot on a particularly identified computing device). In other embodiments, a service provider network 100 provides pools of compute capacity slots that are not specific to any one computing device but that generally represent available slots at any one of a set of computing devices in a defined geographic area (or possibly across multiple areas). Thus, a number of available compute capacity slots in a particular geographic area may depend on a number of computing devices in the area, a total number of capacity slots on each of the computing devices, a number of capacity slots that are not currently occupied by an existing compute instance and are thus available, among other possible factors. The number of available compute capacity slots in a pool of capacity slots may increase and decrease over time as computing devices in the area are added or removed, compute instances running on the computing devices are created and deleted, and so forth.

In an embodiment, at circle "2A," a hardware virtualization service 102 of the service provider network 100 receives and validates the reservation request 116A and, if validated, stores data indicating a reservation 122A in a reservation data store 124. In some embodiments, validation of the reservation request 116A can include determining whether there already exists a reservation in the reservation data store 124 associated with the same source geographic area and destination geographic area indicated in the reservation request 116A for any remaining available compute capacity slots in the identified destination area. If there are no available compute capacity slots or no available compute capacity slots for a particular type of compute instance requested by the user, the hardware virtualization service 102 may deny the user's reservation request or initiate processes to procure one or more computing devices to support the additional reservation request. In other examples, the hardware virtualization service 102 may determine that a compute capacity slot associated with the identified destination geographic area exists that is reserved as a backup for a different computing resource in a different source geographic area (for example, geographic area 112B) but is not reserved as a backup for any computing resource in the source geographic area (geographic area 112A in this example). In this case, the hardware virtualization service 102 can reserve the compute capacity slot for the requesting user 114A even though the same compute capacity slot may be reserved by one or more other users associated with different source geographic areas. In still other examples, the hardware virtualization service 102 may determine that a compute capacity slot that is not currently reserved by any other user can be used to satisfy the reservation request 116A. As illustrated by the broken line in FIG. 1 connecting the user's infrastructure 108A in geographic area 112A and the capacity slot 126 in geographic area 112C, the reservation 122A stored in the reservation data store 124 maps the user's compute instances 110 located in the geographic area 112A to a capacity slot available for reservation in the geographic area 112C.

Figure 2:
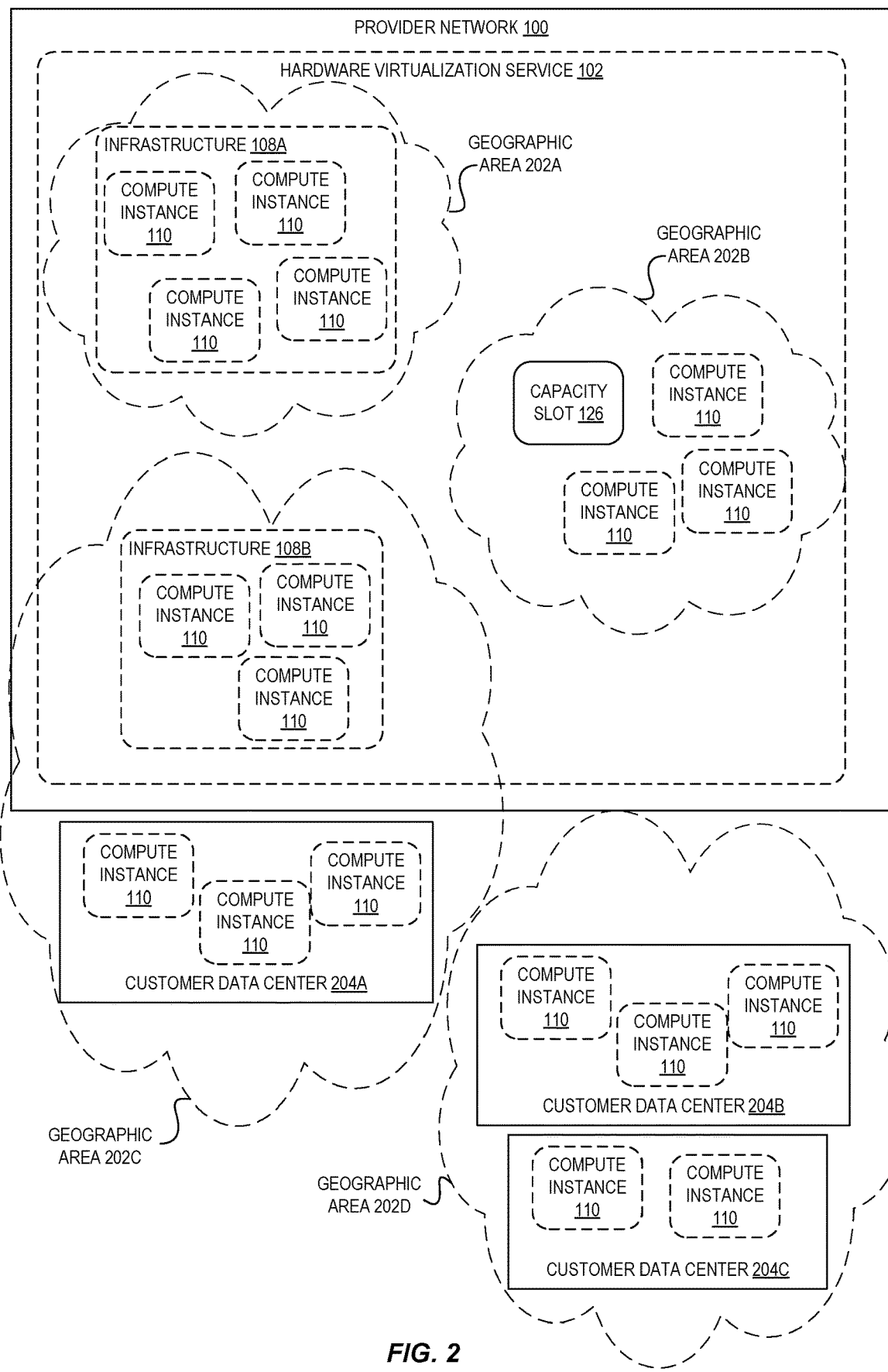
FIG. 2 is a diagram illustrating various ways in which geographic areas may be defined by a service provider network for use in providing compute capacity reservations for disaster recovery scenarios according to some embodiments.

Many of the examples used herein relate to reserving backup compute capacity for compute instances running within a service provider network 100. In FIG. 1, for example, users create disaster recovery reservations for compute instances running at a hardware virtualization service 102 of a service provider network 100. In other examples, users may also be able to create disaster recovery reservations for compute instances that operate outside of a service provider network 100, for example, at one or more user-managed data centers. FIG. 2, for example, is a diagram illustrating various ways in which areas may be defined by a service provider network 100 for use in providing compute capacity reservations for disaster recovery scenarios.

As shown in FIG. 2, one or more geographic areas defined by a service provider network 100 may include only computing resources managed by a service provider (for example, geographic areas 202A and 202B), while other defined geographic areas may include computing resources managed by a service provider as well as computing resources located at external customer data centers (for example, a geographic area 202C including compute instances managed by the service provider network 100 and also including compute instances located at an external customer data center 204A), while still other defined geographic areas may include only computing resources located at external customer data centers (for example, a geographic area 202D including compute instances located at external customer data centers 204B and 204C). For example, customer-managed compute instances and data centers may be mapped to a geographic area defined by a service provider by user request identifying a location of the compute instances, or a service provider may manually or automatically map customer compute instances to particular defined areas (for example, based on IP address or other location identifying information). The ability to map customer-managed compute instances to geographic areas defined by the service provider, for example, can enable users to reserve disaster recovery compute capacity for compute instances external to the service provider network 100 using techniques similar to those described herein with respect to service provider network managed compute instances.

Returning to FIG. 1, if the hardware virtualization service 102 successfully validates the reservation request 116A, the service stores data indicating the requested disaster recovery reservation in a reservation data store 124. For example, the data indicating the disaster recovery reservation can include one or more of: an identifier of the reservation, an identifier of the type of reservation (for example, either a standard compute capacity reservation or a disaster recovery reservation), an identifier of a user account associated with the reservation, an identifier of a type of computing device for the reservation, an indication of the term associated with the reservation, and identifiers of the source and destination geographic areas associated with the reservation. In an embodiment, the hardware virtualization service 102 returns the identifier of the disaster recovery reservation to the user 114A, which the user can use in the event of a disaster recovery scenario.

In an embodiment, at circle "1B," a different user 114B similarly uses the console 104 (or a different type of interface 104) at some point in time to request a disaster recovery compute capacity reservation by sending a separate reservation request 116B. For example, a user 114B may have their own infrastructure 108B comprising a set of compute instances 110 running in a geographic area 112B that is different from the geographic area 112A and for which they also desire to reserve backup compute capacity for disaster recovery scenarios.

In an embodiment, at circle "2B," the hardware virtualization service 102 receives the reservation request 116B and similarly validates the reservation request 116B and, if validated, stores data indicating a reservation 122B in the reservation data store 124. In one embodiment, the hardware virtualization service 102 stores the reservation 122B in the reservation data store 124. Similar to the validation of the reservation request 116A, validation of the reservation request 116B can include determining whether there already exists a reservation in the reservation data store 124 associated with the same source geographic area and destination geographic area indicated in the request 116B for any remaining available compute capacity slots in the identified destination area (for example, geographic area 112C). If there are no available compute capacity slots, the hardware virtualization service 102 may deny the user's reservation request or initiate processes to procure one or more computing devices to support the additional reservation request. In other examples, the hardware virtualization service 102 may determine that a compute capacity slot associated with the identified destination geographic area exists that is reserved as a backup for a different computing resource in a different source geographic area (for example, geographic area 112A) but is not reserved as a backup for any computing resource in the source geographic area (geographic area 112B in this example). In this case, the hardware virtualization service 102 can reserve the compute capacity slot for the requesting user 114B even though the same compute capacity slot may be reserved by one or more other users associated with different source geographic areas. In still other examples, the hardware virtualization service 102 may determine that a compute capacity slot that is not currently reserved by any other user can be used to satisfy the reservation request 116B. As illustrated by the broken line in FIG. 1 connecting the user's infrastructure 108B in geographic area 112B and the capacity slot 126 in geographic area 112C, the reservation 122B stored in the reservation data store 124 maps the user's compute instances 110 located in the geographic area 112B to a capacity slot available for reservation in the geographic area 112C.

Figure 3:
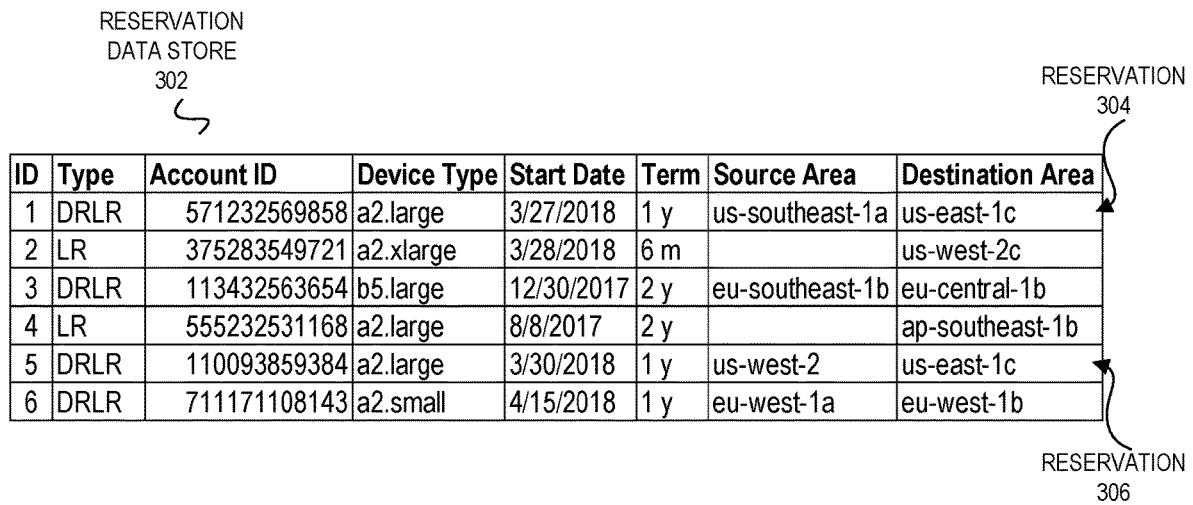
FIG. 3 is a diagram illustrating an example data structure used by a service provider network to store disaster recovery launch reservations according to some embodiments.

As indicated above, a hardware virtualization service 102 generates disaster recovery reservations, which may include multiple reservations for a same unit of compute capacity in a destination geographic area of the service provider network. FIG. 3 illustrates an example of a data structure storing compute capacity reservations, including disaster recovery capacity reservations. As shown, the reservation data store 302 includes several entries, each corresponding to a separate compute capacity reservation.

As shown in FIG. 3, each entry of a reservation data store 302 may include fields including an identifier of the reservation represented by the entry, a type of reservation (for example, either a standard reservation ("LR") or a disaster recovery reservation ("DRLR")), a type of computing device associated with the reservation, a start date for the reservation, a term of the reservation, a source area associated with the reservation (if the reservation is a disaster recovery reservation), and a destination area associated with the reservation. As illustrated by the reservations 304 and 306, in some embodiments, two or more of the reservations may reserve capacity in a same destination area ("us-east-1c") provided that the reservations are associated with different source areas ("us-southeast-1a" for reservation 304 and "us-west-2" for reservation 306) assuming the reservation are reserving a same capacity slot in the destination area.

Returning to FIG. 1, at circle "3," the user 114A may at some point in time after creating a disaster recovery reservation generate a disaster recovery request 120. For example, a user 114A may generate the disaster recovery request 120 in response to detecting that one or more of the compute instances 110 of the user's infrastructure 108A running in the geographic area 112A has failed due to some type of disaster (for example, a hardware or software failure or a natural disaster affecting geographic area 112A). In an embodiment, a disaster recovery request 120 includes an identifier of a disaster recovery reservation that the user intends to use (for example, an identifier of the reservation 122A obtained by the user 114A in circles "1A" and "2A"). In some examples, a disaster recovery request 120 instead may be generated automatically by other entities or components managed by the user 114A, such as a monitoring service that monitors the health and performance of computing instances 110 of the user's infrastructure 108A and automatically generates disaster recovery requests on behalf of the user 114A in response to detecting a failure.

In an embodiment, the hardware virtualization service 102 validates the disaster recovery request 120 and, if the request is successfully validated, at circle "4" the service creates a compute instance using the reserved compute capacity slot. For example, the hardware virtualization service 102 may launch a compute instance at the capacity slot 126 based on a machine image provided by the request 120 or using an identifier of a location at which the machine image is stored as indicated by the reservation request 116B or disaster recovery request 120.

As indicated above, in some embodiments, a hardware virtualization service 102 may perform various operations to determine whether a disaster recovery request 120 is a valid use of a disaster recovery reservation. In general, a disaster recovery request may be considered valid if the request is generated in response to or based on a compute instance failure in the geographic area corresponding to the source geographic area identified in the disaster recovery reservation. For example, the hardware virtualization service 102 or other component of the service provider network 100 may, at some point in time after receiving the request 120, validate that the source area identified by the associated disaster recovery reservation was actually impaired in some way. In the case of a user-induced failure (for example, a user-created software bug), the service provider network 100 may perform operations to verify that the user's compute instance(s) in the source area are experiencing some technical difficulties and that the user is not attempting to the use the disaster recovery reservation for issues occurring at a different location or for other purposes (for example, for additional capacity needs the user is suddenly experiencing). As one example validation check, the service provider network 100 may successfully validate a disaster recovery request 120 only if it is determined that the requesting user has terminated a corresponding compute instance in the source area associated with the reservation.

In some embodiments, a hardware virtualization service 102 may further perform various operations to mitigate various forms of possible abuse of disaster recovery reservations by users. In general, abuse of a disaster recovery reservation may include using reserved capacity for reasons other than a disaster or failure in the source area associated with the reservation, using reserved capacity for disasters or failures that occur in source areas that are different from that specified in the reservation, using the reserved capacity for a period time that is longer than is necessary to recover from a disaster or failure, among other possible abuses. According to various embodiments, a service provider network 100 may use various techniques to mitigate such abuse of disaster recovery reservations including, but not limited to, enforcing time limits on the use of compute capacity associated with the reservations, increasing an amount charged to customers for use of the reserved compute capacity, predicating the use of reserved computed capacity on a trust score assigned to users, and examining users' past behavior (for example, using machine learning techniques or other analyses of users' behavior patterns to determine to trust the customer).

In one embodiment, a hardware virtualization service 102 may implement tenure restrictions, or time limits, on compute instances using reserved compute capacity to mitigate various forms of potential abuse. For example, tenure restrictions may be implemented to allow occupancy of reserved compute capacity for only a defined amount of time (for example, 12 hours, 1 day, or 1 week). In this example, if a customer uses a reserved compute capacity slot for longer than the defined amount of time, the service provider network may evict the compute instance using the spare capacity or possibly allow a customer to request more time. In various embodiments, a tenure limit can correspond to a single, continuous period of time (for example, no more than seven continuous days) or corresponding a total amount of time which the capacity can be used during the reservation term (for example, at most seven days total during the reservation term), or any combinations thereof. In an embodiment, a tenure restriction can also include limiting a total number of times that a customer can use reserve capacity regardless of the duration of each use (for example, at most five separate uses during the reservation term).

In some embodiments, validation of a disaster recovery request involves identifying a score associated with the user indicating a measured level of trustworthiness of the user. For example, a service provider network may assign to users a trustworthiness score that determines certain behaviors in the infrastructure (for example, higher trustworthiness scores may allow some users to launch more compute instances of certain types compared to others, and so forth). In this example, the higher a user's trustworthiness score, the more likely the service provider network 100 may be to allow a user to create and use disaster recovery reservations.

In one embodiment, validation of a disaster recovery request involves determining a type of failure associated with the request (for example, a request may indicate whether the cause of the failure is related to the service provider's infrastructure or to a user-induced issue) and handling each of these cases differently. In the case of a user-induced failure, the user may be directed to make a separate request to a technical support interface indicating that the user desires to use the reserved disaster recovery capacity. In response the request, a technical support team can validate the request (for example, by determining whether the failure indicated by the user actually exists) and allow users to use the requested reserved capacity if successfully validated. This process may also be useful, for example, for customers that may be performing test disaster recovery drills so that the service provider can ensure that the test does not conflict with other planned or unplanned uses of the reserved compute capacity.

Figure 4:
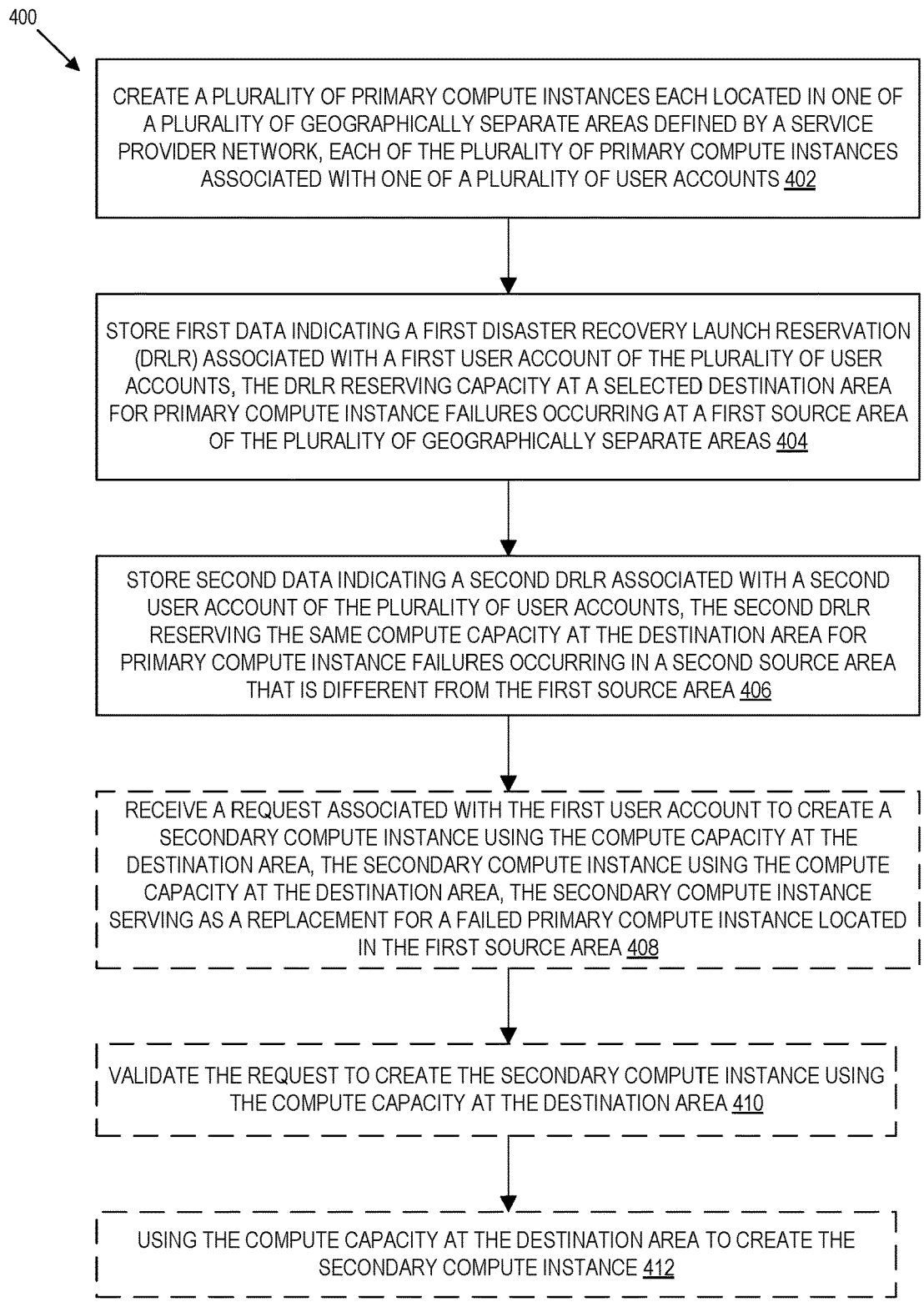
FIG. 4 is a flow diagram illustrating a process for creating and using compute capacity reservations for disaster recovery scenarios according to some embodiments.

FIG. 4 is a flow diagram illustrating operations 400 for creating and using compute capacity reservations for disaster recovery scenarios according to some embodiments. Some or all of the operations 400 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by a hardware virtualization service 102 or other components of a service provider network 100 of the other figures.

The operations 400 include, at block 402, creating a plurality of primary compute instances each located in one of a plurality of separate areas defined by a service provider network, each of the plurality of primary compute instances associated with one of a plurality of user accounts. For example, referring to FIG. 1, users may request creation of any number of compute instances 110 at any number of different geographic areas (for example, geographic areas 108A-108C) to support the users' IT infrastructures or other applications. Some or all of the compute instances 110 may be associated with a user account responsible for creating or managing the compute instances (for example, user accounts associated with users 114A and 114B in FIG. 1).

The operations 400 further include, at block 404, storing first data indicating a first disaster recovery launch reservation (DRLR) associated with a first user account of the plurality of user accounts, the DRLR reserving capacity at a selected destination area for primary compute instance failures occurring at a first source area of the plurality of separate areas. In FIG. 1, for example, a hardware virtualization service 102 stores a reservation 122A in response to receiving a reservation request 116A, where the reservation 122A reserves capacity at the geographic area 112C for primary compute instance failures occurring at the geographic area 112A. In one embodiment, the data indicating the reservation of the compute capacity slot includes one or more of: an identifier of the user account, an identifier of the source geographic area, an identifier of the destination geographic area, a type of computing device at which to reserve the capacity slot, and a reservation term (for example, six months, one year, three years, and so forth), among other possible information.

In some embodiments, the service provider network receives a request to reserve a compute capacity slot within a destination area of the service provider network to serve as backup for the computing resource in the source area of the provider network, the request associated with the user account of the service provider network. In FIG. 1 again, for example, a user 114A may generate a reservation request 116A to obtain the reservation 122A. In one embodiment, the request indicates one or more of: an identifier of the user account, a type of computing device at which to reserve the capacity slot, the source geographic area, the destination geographic area, and a reservation term, among other possible information. In an embodiment, the service provider network provides a pool of compute capacity slots in the destination geographic area available for reservation, and the compute capacity slot is part of the pool of compute capacity slots. For example, the capacity slot 126 in FIG. 1 may be one of any number of capacity slots that are part of a pool associated with the geographic area 112C, where the pool may be further associated with a particular type of computing device.

The operations 400 further include, at block 406, storing second data indicating a second DRLR associated with a second user account of the plurality of user accounts, the second DRLR reserving the same compute capacity at the destination area for primary compute instance failures occurring in a second source area that is different from the first source area. In one embodiment, the service provider network determines that a compute capacity slot associated with the destination geographic area exists that is reserved as backup for a different computing resource in a different source geographic area but is not reserved as a backup for any computing resource in the source geographic area. For example, the reservation 122B in FIG. 1 is a reservation for the same capacity slot 126 in geographic area 112C but is associated with a source area (area 112B) that is different from the source area associated with the reservation 122A (area 112A).

The operations 400 further include, at block 408, receiving a request associated with the first user account to create a secondary compute instance using the compute capacity at the destination area, the secondary compute instance serving as a replacement for a failed primary compute instance located in the first source area. For example, in FIG. 1 the hardware virtualization service 102 receives a disaster recovery request 120 from the user 114A at some point after the user obtained the reservation 122A.

The operations 400 further include, at block 410, optionally validating the request to create the secondary compute instance using the compute capacity at the destination area. In one embodiment, validating the request includes determining a status of the failed compute instance located in the source geographic area. For example, in response to receiving the disaster recovery request 120 in FIG. 1, the hardware virtualization service 102 may determine a status the compute instances 110 in area 112A with which the reservation 122A is associated to determine whether the request 120 is a valid request.

The operations 400 further include, at block 412, using the compute capacity at the destination area to create the secondary compute instance. For example, the hardware virtualization service 102 in FIG. 1 creates a compute instance using the capacity slot 126 in response to receiving and validating the disaster recovery request 120.

In an embodiment, the service provider network may perform operations to mitigate potential abuse of the reserved compute capacity after a compute instance is created using a reserved capacity slot. For example, the service provider network may determine that the compute instance has executed using the compute capacity slot for more than a specified amount of time and, in response to the determination, remove or other cause the compute instance to vacate from the compute capacity slot. In other examples, the service provider network may determine that the associated user account has already used the compute capacity slot a maximum number of times and deny the user's request to create the compute instance using the reserved capacity slot.

Figure 5:
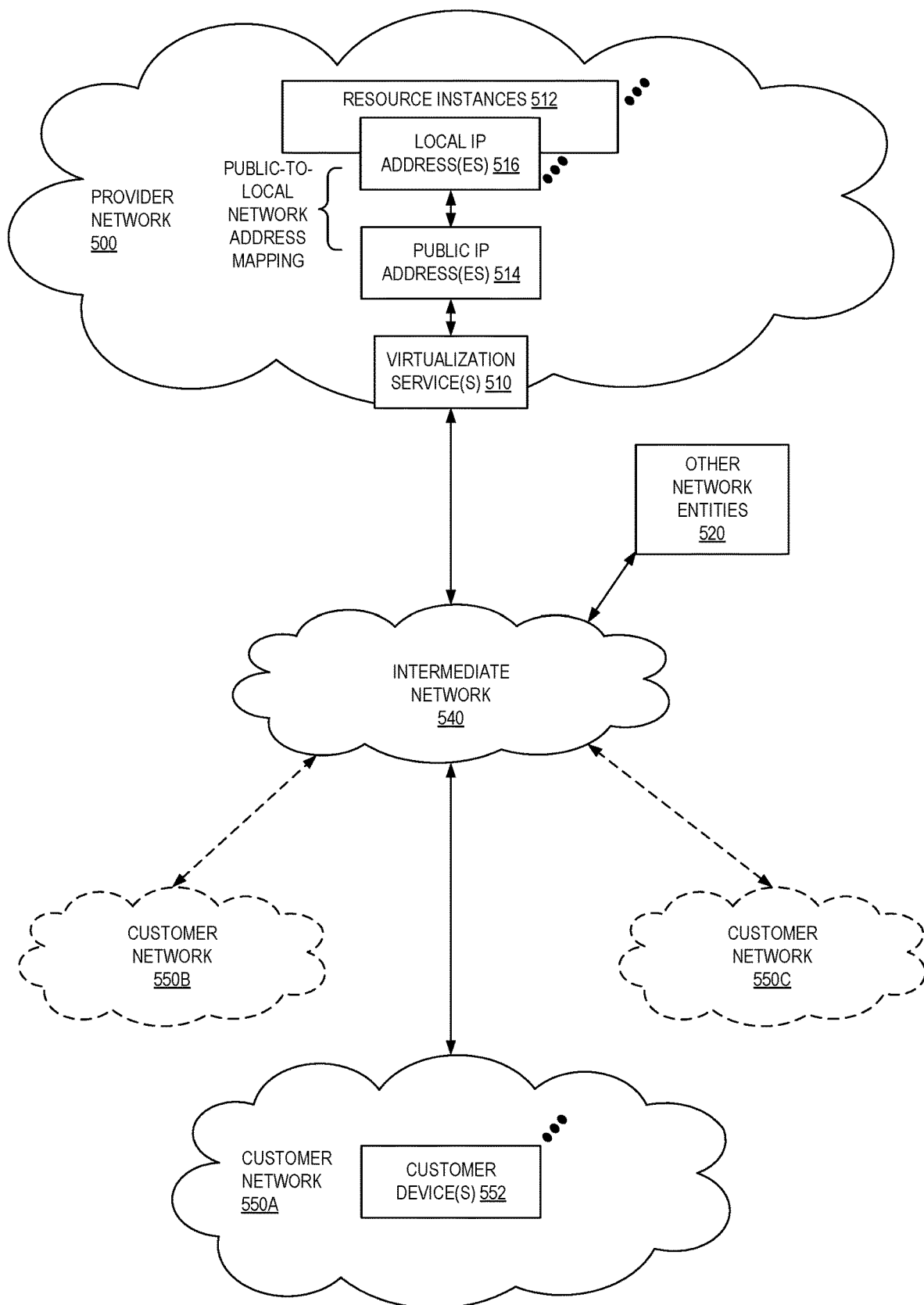
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local IP addresses 516 may be associated with the resource instances 512; the local IP addresses are the internal network addresses of the resource instances 512 on the provider network 500. In some embodiments, the provider network 500 may also provide public IP addresses 514 and/or public IP address ranges (for example, Internet Protocol version 4 (IPv4) or Internet Protocol version 6 (IPv6) addresses) that customers may obtain from the provider 500.

Conventionally, the provider network 500, via the virtualization services 510, may allow a customer of the service provider (for example, a customer that operates one or more client networks 550A-550C including one or more customer device(s) 552) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-550C may, for example, implement customer-specific applications and present the customer's applications on an intermediate network 540, such as the Internet. Other network entities 520 on the intermediate network 540 may then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
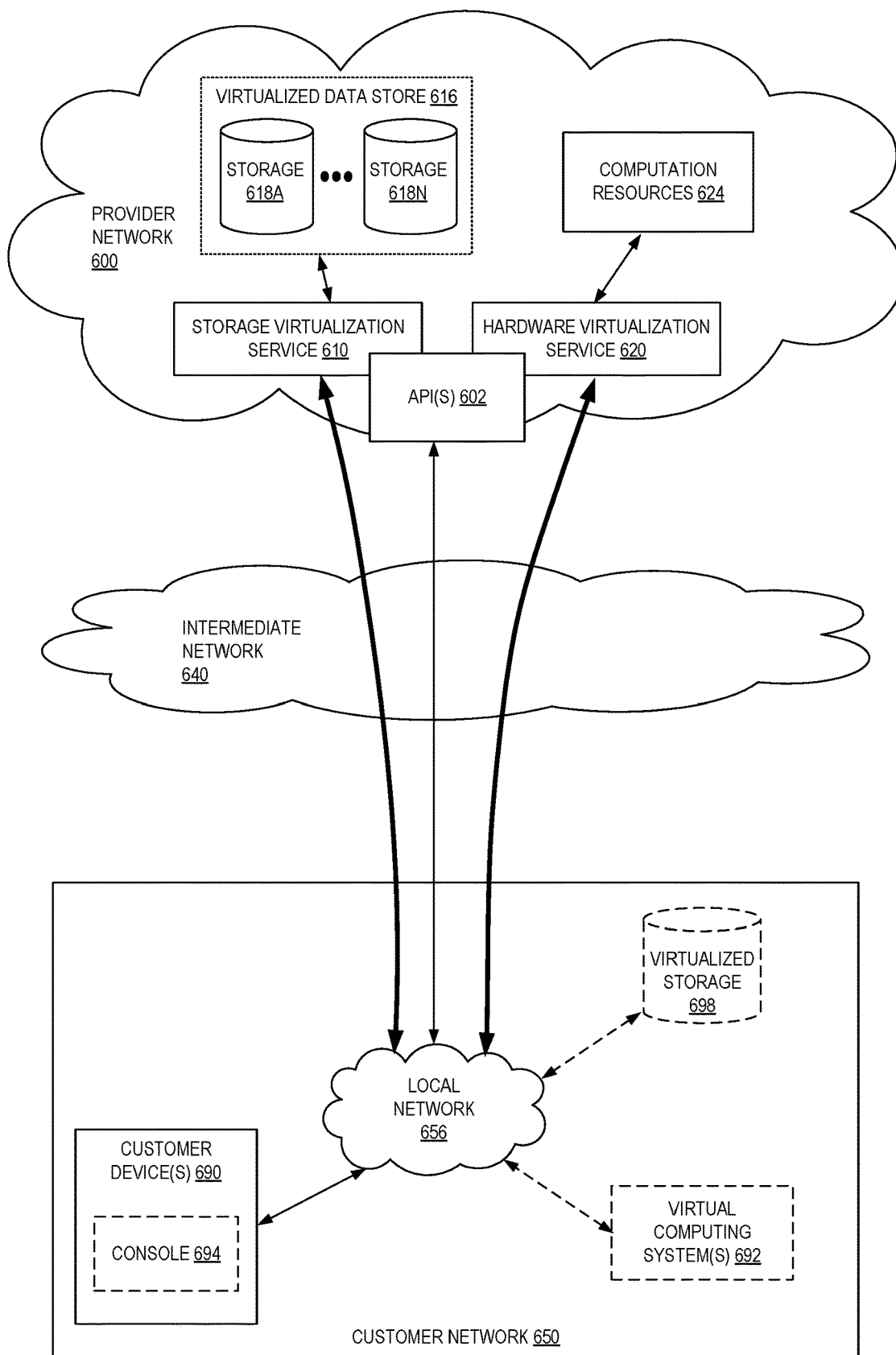
FIG. 6 is a block diagram of an example provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (for example, VMs) to customers. The computation resources 624 may, for example, be rented or leased to customers of the provider network 600 (for example, to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (for example, a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (for example, via console 694), the customer may access the functionality of storage virtualization service 610, for example via one or more APIs 602, to access data from and store data to storage resources 618A-618N of a virtual data store 616 provided by the provider network 600. In some embodiments, a virtualized data store gateway (not shown) may be provided at the customer network 650 that may locally cache at least some data, for example frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Illustrative System

Figure 7:
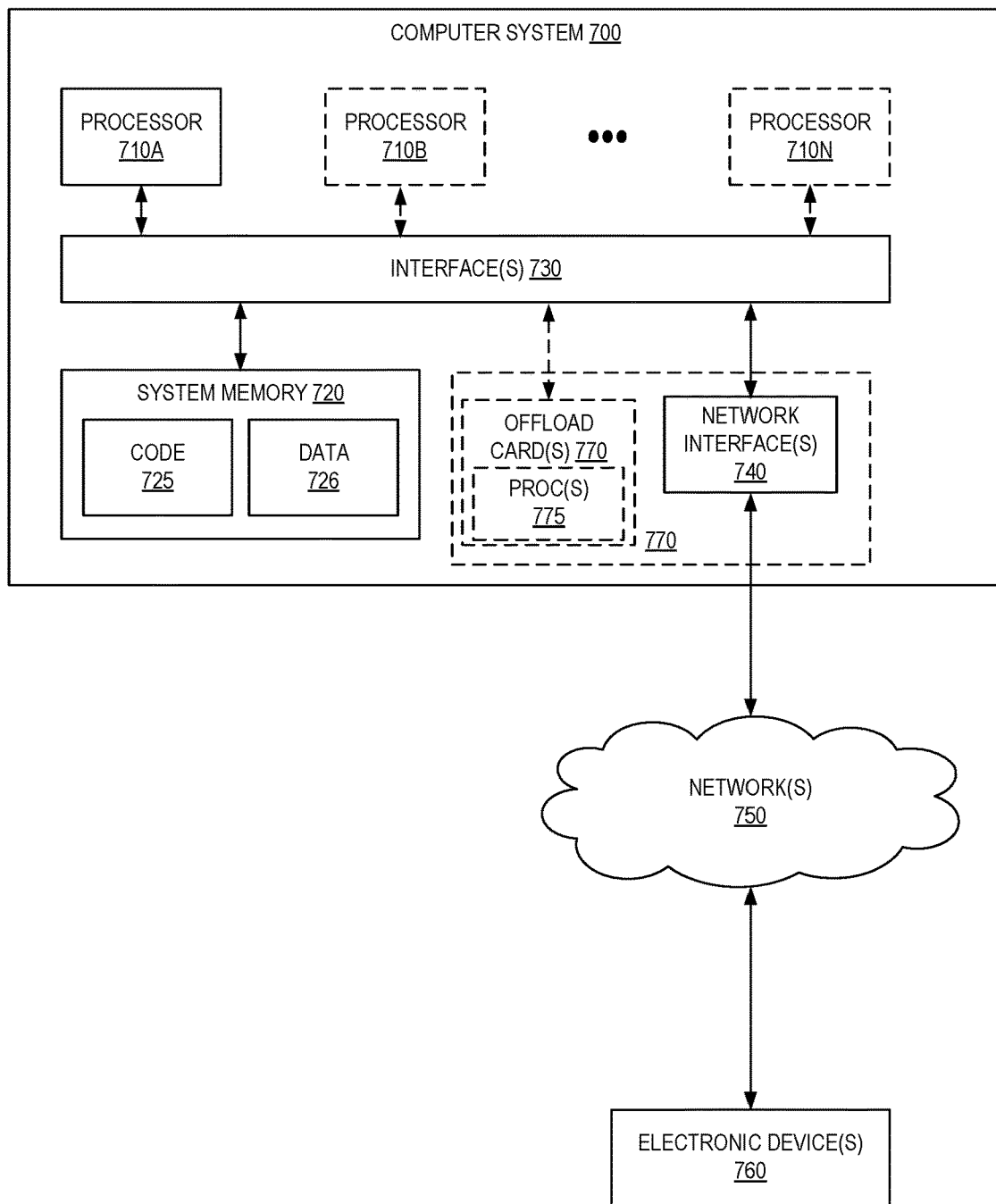
FIG. 7 is a block diagram illustrating an example computer system that may be used in some embodiments.

In some embodiments, a system that implements a portion or all of the techniques for enabling users to create reservations for compute capacity at a service provider network intended for use in disaster recovery scenarios as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (for example, two, four, eight, or another suitable number).

Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (for example, system memory 720) into a format suitable for use by another component (for example, processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (for example, operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (for example, upon a request from a hypervisor) that is executed by the other processors 710A-710N of the computer system 700. However, in some embodiments the virtualization manager implemented by the offload card(s) 770 can accommodate requests from other entities (for example, from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 700 via I/O interface 730. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 108A-108B, 112A-112C, and so forth) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   creating, by a service provider network, a plurality of primary compute instances each located in one of a plurality of geographically separate areas defined by the service provider network, each of the plurality of primary compute instances associated with one of a plurality of user accounts;
   storing first data indicating a first disaster recovery launch reservation (DRLR) associated with a first user account of the plurality of user accounts, wherein the first data includes identifiers of a first source area and a destination area, and wherein the first DRLR reserves a compute capacity slot at the destination area for primary compute instance failures occurring in the first source area of the plurality of geographically separate areas;
   storing second data indicating a second DRLR associated with a second user account of the plurality of user accounts, wherein the second data includes identifiers of a second source area and the destination area, wherein the second source area is different from the first source area, and wherein the second DRLR reserves the same compute capacity slot at the destination area for primary compute instance failures occurring in the second source area, wherein the storing second data further comprises:
      determining that the compute capacity slot at the destination area exists that is reserved as a backup for a computing resource in a source area different from the second source area but is not reserved as a backup for any computing resource in the second source area;
   receiving a request associated with the first user account to create a secondary compute instance using the compute capacity slot at the destination area, the secondary compute instance serving as a replacement for a failed primary compute instance located in the first source area; and
   using the compute capacity slot at the destination area to create the secondary compute instance.

2. The computer-implemented method of claim 1, wherein the service provider network provides a pool of compute capacity slots in the destination area available for reservation, and wherein the same compute capacity slot is part of the pool of compute capacity slots.

3. The computer-implemented method of claim 1, further comprising validating the request associated with the first user account to create the secondary compute instance using the compute capacity slot at the destination by determining a status of the failed primary compute instance located in the first source area.

4. A computer-implemented method comprising:
   receiving a request to reserve a compute capacity slot within a destination area of a service provider network to serve as a backup for a computing resource in a source area of the service provider network, wherein the request is associated with a user account of the service provider network;
   determining that a compute capacity slot associated with the destination area exists that is reserved as a backup for a different computing resource in a different source area but is not reserved as a backup for any computing resource in the source area;
   storing data indicating a reservation of the compute capacity slot for the user account, wherein the data includes identifiers of the source area and the destination area; and
   using the compute capacity slot to create a secondary compute instance as a replacement for a failed primary compute instance located in the source area.

5. The computer-implemented method of claim 4, wherein the service provider network provides a pool of compute capacity slots in the destination area available for reservation, and wherein the compute capacity slot is part of the pool of compute capacity slots.

6. The computer-implemented method of claim 4, further comprising:
   receiving a request associated with the user account to create a compute instance using the compute capacity slot associated with the destination area, the compute instance serving as a replacement for a failed compute instance located in the source area; and
   using a computing device associated with the compute capacity slot at the destination area to create the compute instance.

7. The computer-implemented method of claim 4, further comprising:
   receiving a request associated with the user account to create a compute instance using the compute capacity slot associated with the destination area, the compute instance serving as a replacement for a failed compute instance located in the source area; and
   validating the request by determining a status of the failed compute instance located in the source area.

8. The computer-implemented method of claim 4, further comprising:
   using a computing device associated with the compute capacity slot at the destination area to create a compute instance serving as a replacement for a failed compute instance located in the source area;
   determining that the compute instance has executed at the computing device for longer than a defined amount of time; and
   removing the compute instance from the compute capacity slot.

9. The computer-implemented method of claim 4, further comprising:
   receiving a request associated with the user account to create a compute instance using the compute capacity slot associated with the destination area;

determining that the user account has already used the compute capacity slot a maximum number of times; and denying the request to create the compute instance.

10. The computer-implemented method of claim 4, further comprising:
receiving a request associated with the user account to create a compute instance using the compute capacity slot associated with the destination area;
determining that no compute instances associated with the user account have been terminated in the source area; and
denying the request to create the compute instance.

11. The computer-implemented method of claim 4, wherein the source area and the destination area correspond to defined geographic areas of the service provider network.

12. The computer-implemented method of claim 4, wherein the data indicating the reservation of the compute capacity slot includes one or more of: an identifier of the user account, a type of computing device at which the compute capacity slot exists, an identifier of the source area, an identifier of the destination area, and a reservation term.

13. The computer-implemented method of claim 4, wherein the determining further includes determining that less than a defined maximum number of reservations exist for the compute capacity slot.

14. The computer-implemented method of claim 4, wherein the computing resource is located at a user's on-premises data center, and wherein the service provider network maps the user's on-premises data center to the source area.

15. A system comprising:
a plurality of compute instances implemented by a first one or more electronic devices, each compute instance of the plurality of compute instances located in one of a plurality of geographically separate areas defined by a service provider network and associated with one of a plurality of user accounts; and
a hardware virtualization service implemented by a second one or more electronic devices, the hardware virtualization service including instructions that upon execution cause the hardware virtualization service to:
store first data indicating a first disaster recovery launch reservation (DRLR) associated with a first user account of the plurality of user accounts, wherein the first data includes identifiers of a first source area and a destination area, and wherein the first DRLR reserves a compute capacity slot at the destination area for primary compute instance failures occurring in the first source area of the plurality of geographically separate areas;
store second data indicating a second DRLR associated with a second user account of the plurality of user accounts, wherein the second data includes identifiers of a second source area and the destination area, wherein the second source area is different from the first source area, and wherein the second DRLR reserves the same compute capacity slot at the destination area for primary compute instance failures occurring in the second source area, wherein to store second data further comprises:
determining that the compute capacity slot at the destination area exists that is reserved as a backup for a computing resource in a source area different from the second source area but is not reserved as a backup for any computing resource in the second source area;
receive a request associated with the first user account to create a secondary compute instance using the compute capacity slot at the destination area, the secondary compute instance serving as a replacement for a failed primary compute instance located in the first source area; and
use the compute capacity slot at the destination area to create the secondary compute instance.

16. The system of claim 15, wherein the hardware virtualization service provides a pool of compute capacity slots in the destination area available for reservation, and wherein the compute capacity slot is part of the pool of compute capacity slots.

17. The system of claim 15, wherein the instructions, upon execution, further cause the hardware virtualization service to validate the request associated with the first user account to create the secondary compute instance using the compute capacity slot at the destination area by determining a status of the failed primary compute instance located in the first source area.

18. The system of claim 15, wherein the instructions, upon execution, further cause the hardware virtualization service to:
use a computing device associated with the compute capacity slot at the destination area to create a compute instance serving as a replacement for a failed compute instance located in the first source area;
determine that the compute instance has executed at the computing device for longer than a defined amount of time; and
remove the compute instance from the compute capacity slot.

19. The system of claim 15, wherein the first data indicating the first DRLR includes one or more of: an identifier of the first user account, an identifier of the source area, an identifier of the destination area, and a reservation term.

20. The system of claim 15, wherein the failed primary compute instance is located at a user's on-premises data center, and wherein the service provider network maps the user's on-premises data center to the first source area.

\* \* \* \* \*